(12) United States Patent
Gimmler et al.

(10) Patent No.: US 10,750,772 B2
(45) Date of Patent: Aug. 25, 2020

(54) APPARATUS AND METHOD FOR PRODUCING FLAKE-LIKE CEREAL WITHOUT THE USE OF A FLAKING MILL

(71) Applicant: Kellogg Company, Battle Creek, MI (US)

(72) Inventors: Norbert Gimmler, Portage, MI (US); Kevin J. Laubenthal, Battle Creek, MI (US)

(73) Assignee: KELLOGG COMPANY, Battle Creek, MI (US)

( * ) Notice: Subject to any disclaimer, the term of this patent is extended or adjusted under 35 U.S.C. 154(b) by 402 days.

(21) Appl. No.: 15/408,511

(22) Filed: Jan. 18, 2017

(65) Prior Publication Data
US 2017/0202261 A1    Jul. 20, 2017

Related U.S. Application Data

(60) Provisional application No. 62/279,898, filed on Jan. 18, 2016.

(51) Int. Cl.
| | |
|---|---|
| *A23P 30/20* | (2016.01) |
| *A21C 11/16* | (2006.01) |
| *A23P 30/34* | (2016.01) |
| *A23L 7/17* | (2016.01) |
| *A23L 7/117* | (2016.01) |
| *A21C 11/10* | (2006.01) |
| *A23L 7/10* | (2016.01) |

(52) U.S. Cl.
CPC .............. *A23P 30/20* (2016.08); *A21C 11/10* (2013.01); *A21C 11/16* (2013.01); *A23L 7/117* (2016.08); *A23L 7/17* (2016.08); *A23L 7/198* (2016.08); *A23P 30/34* (2016.08); *A23V 2002/00* (2013.01)

(58) Field of Classification Search
CPC .......... A23P 30/20; A23P 30/34; A23L 7/117; A23L 7/198; A23L 7/17; A21C 11/10; A21C 11/16; A23V 2002/00
USPC .......... 99/509, 326, 353; 426/618, 619, 620, 426/621, 560, 516
See application file for complete search history.

(56) References Cited

U.S. PATENT DOCUMENTS

| | | | |
|---|---|---|---|
| 2,093,260 A | 9/1937 | Wilder et al. | |
| 2,339,419 A | 1/1944 | McKay | |
| 2,858,217 A * | 10/1958 | Benson | A23L 7/135 425/131.1 |
| 2,858,219 A * | 10/1958 | Benson | A21C 11/16 425/308 |
| 3,314,381 A * | 4/1967 | Fries | A21C 9/06 425/131.1 |
| 3,447,931 A | 6/1969 | Benson et al. | |
| 3,544,332 A | 12/1970 | Leebens | |

(Continued)

FOREIGN PATENT DOCUMENTS

| | | |
|---|---|---|
| GB | 401555 | 11/1933 |
| GB | 442759 | 5/1936 |

(Continued)

OTHER PUBLICATIONS

PCT/US2017/013919 International Search Report dated Apr. 21, 2017.

*Primary Examiner* — Jimmy Chou
(74) *Attorney, Agent, or Firm* — Honigman LLP; Kathryn D. Doyle, Esq.; Jonathan P. O'Brien

(57) ABSTRACT

An apparatus and method for producing flake-like cereal without the use of a flaking mill.

8 Claims, 7 Drawing Sheets

(56) References Cited

U.S. PATENT DOCUMENTS

| | | | |
|---|---|---|---|
| 3,605,649 A * | 9/1971 | Bundus | A23L 7/17 264/53 |
| 3,779,676 A * | 12/1973 | Bernard | A23G 3/2015 425/131.1 |
| 4,217,083 A * | 8/1980 | Machuque | A21C 11/20 425/198 |
| 4,398,127 A * | 8/1983 | Bahn | H05B 41/325 315/151 |
| 4,422,372 A * | 12/1983 | Hoezee | A22C 7/00 241/60 |
| 4,814,196 A * | 3/1989 | Taguchi | A23P 30/34 426/516 |
| 4,963,373 A | 10/1990 | Fan et al. | |
| 5,149,555 A | 9/1992 | Flindall | |
| 5,523,109 A | 6/1996 | Hellweg et al. | |
| 5,694,833 A * | 12/1997 | Wenger | A23K 50/80 99/348 |
| 5,843,503 A | 12/1998 | Clanton et al. | |
| 5,891,503 A | 4/1999 | Heck et al. | |
| 5,919,509 A | 7/1999 | Cremers et al. | |
| 5,939,124 A * | 8/1999 | Wenger | B30B 11/005 426/516 |
| 6,001,408 A * | 12/1999 | Dudacek | B29C 48/505 426/516 |
| 6,106,888 A * | 8/2000 | Dale | A23P 30/34 426/636 |
| 6,132,079 A * | 10/2000 | King | B01F 5/0451 366/175.2 |
| 6,258,396 B1 * | 7/2001 | Deutsch | A21C 11/16 426/449 |
| 6,274,189 B1 * | 8/2001 | Kazemzadeh | A23P 30/20 426/425 |
| 6,387,421 B1 | 5/2002 | Clanton et al. | |
| 6,620,448 B2 * | 9/2003 | Keller | A23G 3/2015 426/512 |
| 6,866,878 B1 * | 3/2005 | Battaglia | A21C 11/163 426/275 |
| 7,235,276 B2 | 6/2007 | Allen et al. | |
| 7,252,847 B2 * | 8/2007 | Keller | A23P 30/25 426/94 |
| 7,390,520 B2 * | 6/2008 | Dempsey | A23K 40/20 426/512 |
| 7,413,760 B2 * | 8/2008 | Green | A23G 7/02 426/620 |
| 7,585,532 B2 * | 9/2009 | Moore | A23G 3/2015 426/446 |
| 7,648,352 B2 * | 1/2010 | Morales-Alvarez | A23G 1/202 425/131.1 |
| 7,654,813 B1 * | 2/2010 | Kearns | A23N 17/005 425/208 |
| 7,748,312 B2 * | 7/2010 | Pfaller | A21C 3/04 426/512 |
| 7,935,376 B2 | 5/2011 | Wilson et al. | |
| 8,287,268 B1 * | 10/2012 | Thomas | F26B 5/14 425/382.4 |
| 8,313,788 B2 * | 11/2012 | Licker | A21D 2/263 426/559 |
| 8,361,528 B2 | 1/2013 | Schopf et al. | |
| 8,366,433 B2 | 2/2013 | Chatel et al. | |
| 8,968,816 B2 * | 3/2015 | Rassi | A21C 11/103 426/621 |
| 2004/0206246 A1 * | 10/2004 | Bortone | A23P 30/20 99/353 |
| 2005/0048180 A1 * | 3/2005 | Moore | A23G 3/2015 426/516 |
| 2009/0155444 A1 * | 6/2009 | Yakubu | A23J 3/26 426/621 |
| 2009/0196949 A1 * | 8/2009 | Winowiski | A23K 40/20 426/2 |
| 2009/0291186 A1 * | 11/2009 | Bejarano Wallens | A21D 13/42 426/560 |
| 2009/0317520 A1 * | 12/2009 | Lykomitros | A23P 20/12 426/93 |
| 2010/0143549 A1 * | 6/2010 | Hoyt | A21C 11/16 426/233 |
| 2011/0059209 A1 * | 3/2011 | Khatchadourian | A21C 11/006 426/232 |
| 2011/0281003 A1 * | 11/2011 | Alruqaie | A23N 17/005 426/311 |
| 2011/0311669 A1 * | 12/2011 | Gimmler | A21C 11/163 425/131.1 |
| 2012/0052155 A1 * | 3/2012 | Grote | A21C 3/04 426/19 |
| 2012/0260808 A1 * | 10/2012 | Thomas | F26B 5/14 99/326 |
| 2013/0115338 A1 * | 5/2013 | Clarke | A23G 1/50 426/103 |
| 2013/0209647 A1 * | 8/2013 | Rassi | A21C 11/103 426/560 |
| 2013/0273206 A1 * | 10/2013 | Moulton | A23K 40/20 426/62 |
| 2014/0234512 A1 * | 8/2014 | Cronje | A23L 2/40 426/548 |
| 2016/0037803 A1 * | 2/2016 | Tumagyan | A23N 17/005 426/11 |
| 2016/0066600 A1 * | 3/2016 | Barrows | A23K 40/20 426/72 |

FOREIGN PATENT DOCUMENTS

| | | |
|---|---|---|
| GB | 557973 | 12/1943 |
| GB | 905270 | 9/1962 |
| GB | 2176089 | 12/1986 |

* cited by examiner

APPARATUS AND METHOD FOR PRODUCING FLAKE-LIKE CEREAL WITHOUT THE USE OF A FLAKING MILL

CROSS-REFERENCE TO RELATED APPLICATIONS

This application claims priority under 35 U.S.C. § 119(e) to U.S. Provisional Application 62/279,898, filed on Jan. 18, 2016, the entire contents of which are incorporated herein by reference.

TECHNICAL FIELD

This disclosure relates to an apparatus and method for producing flake-like cereal without the use of a flaking mill.

BACKGROUND

Flaked cereal are typically produced by cooking coarse grain materials, such as corn grits, together with water, steam, and optionally one or more of flavor, appearance, and texture-influencing ingredients, such as sugar, malt extract, and salt, using a rotary cooker. The cooked coarse grain material is then partially dried. After it is partially dried, the partially dried grain material may be optionally tempered, meaning the partially dried grain material is allowed to rest for a certain period of time. The partially dried grain material is then flaked into thin slices by use of a flaking mill and toasted, wherein the flaked grain material is further dried and partially browned using a toaster oven.

An alternative method for producing flaked cereal is by feeding milled grain material, such as corn meal or flour, into the feed section of a cooking extruder, mixing said corn meal or flour with water, optionally steam, and optionally one or more other flavor, appearance, and texture-influencing ingredients such as sugar and salt, and cooking the food material to at least partially gelatinize the starch component of the food material inside the cooking extruder. The cooked food material is then transferred to a forming extruder via a connecting closed pipe, wherein the cooked food material inside the forming extruder is cooled to a temperature below 212° F., extruded through one or a multitude of die orifices of a given shape, preferably a round shape, and cut by the use of a cutting knife assembly. The cut food material pieces are then transferred to a dryer and partially dried. After they are partially dried, the partially dried cut food material pieces may be optionally tempered, meaning the partially dried cut food material pieces are allowed to rest for a certain period of time. The partially dried cut food pieces are then flaked into thin slices by use of a flaking mill and toasted, wherein the flaked grain material is further dried and partially browned using a toaster oven.

The method described above can be optionally enhanced by using a pre-conditioner to mix the milled grain material with all other above-mentioned ingredients prior to feeding the material into the cooking extruder. The method described above can be optionally further enhanced by performing the cooking, cooling and forming of the food material by only a cooking extruder, without transfer to and use of a separate forming extruder. This can be accomplished by use of a vent port in a section of the cooking extruder.

Both above-mentioned methods for producing flaked cereal involve the use of at least four unit operations, most commonly the use of five or six unit operations, and the addition and removal of large quantities of water, most commonly the addition of water to about 27 to 35 percent of the total mass of the cooked food material. Both of the above-mentioned methods also involve a significant amount of time for the treatment of the food material, commonly involving at least 30 minutes of total processing time and most commonly about one hour. When a tempering step is added to the process, the total processing time can extend up to a total of two hours or more.

In other examples, a simplified version of the second of the two methods described above is presented, in which the cooked cereal dough is cold-formed into slices of the thickness of the desired final flake product, eliminating the need for using a flaking mill. However, this method still requires cooking the grain material at a relatively high moisture content of between 20 and 30 percent, cooling the cooked grain material to a temperature below 212° F. via the use of a cold-former or the use of a cooling section with a vent port to avoid puffing of the sliced cereal pieces, and performing a secondary drying step after toasting of the cold-formed cereal slices to reduce the moisture of the finished cereal pieces to a shelf-stable level of typically less than three percent.

DESCRIPTION OF DRAWINGS

Like reference symbols in the various drawings indicate like elements.

DETAILED DESCRIPTION

Figure 1:
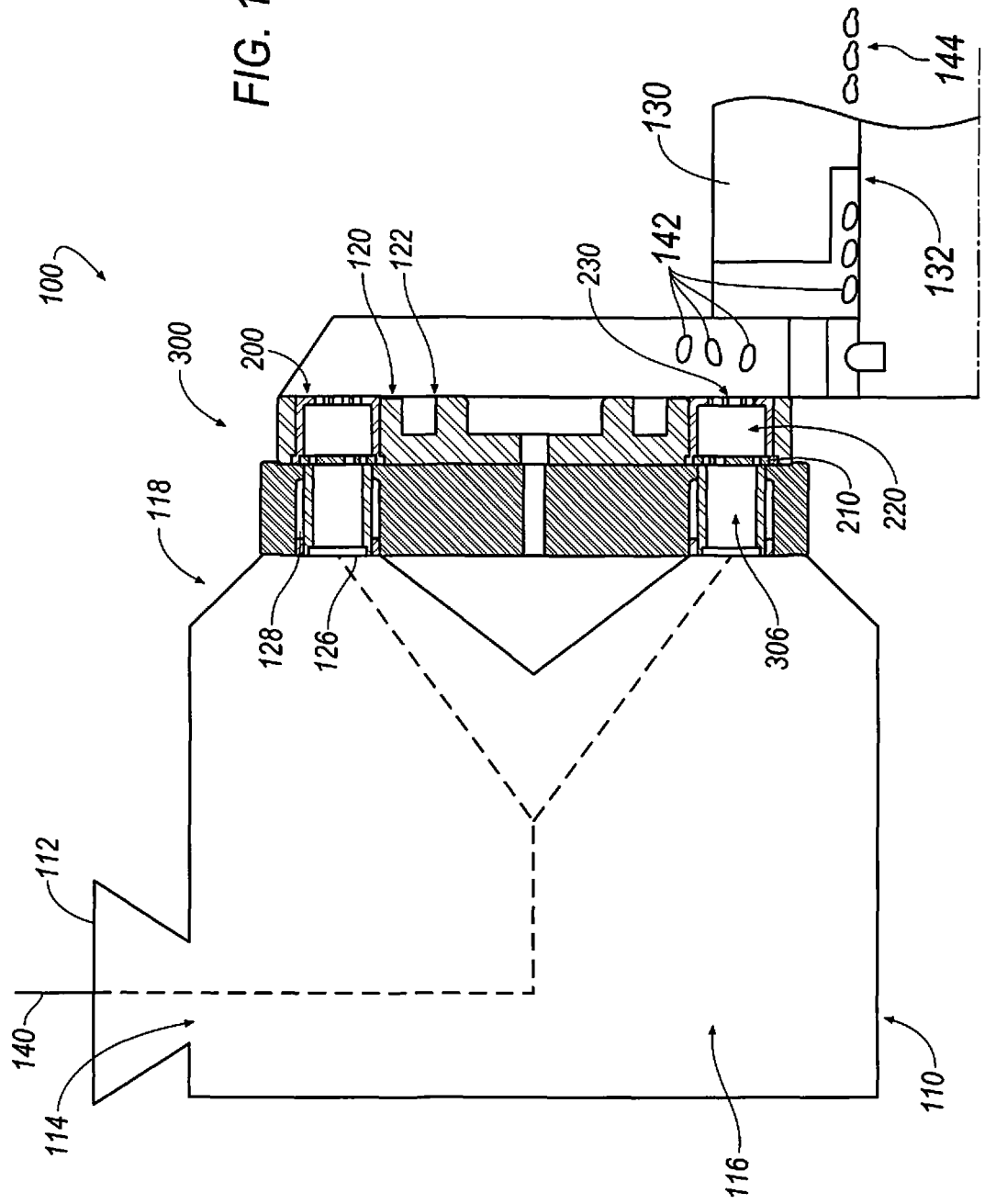
FIG. 1 is a schematic view of an extruder system.

FIG. 1 provides a schematic view of an extruder system 100. The extruder system includes a cooking extruder 110, an extruder die 300 containing one or more orifices 200, a cutting knife assembly 120 that swipes over the discharge surface of the extruder orifice 200, and a toaster oven 130. Food material 140 is input into the extruder system 100 at the cooking extruder input 112. The food material 140 consists of an individual or a blend of starch-containing food materials, such as grain flour mixed with other flavor, appearance and texture-influencing ingredients, such as sugar and salt. The food material 140 is input into the feed section 114 of a common single, twin, or multiple screw cooking extruder 110. The cooking extruder 110 mixes the starch-containing food material 140 with water, optionally steam, and optionally liquid food materials, such as a solution of sugar, malt extract, salt, and other flavor, texture and appearance-influencing ingredients. The cooking extruder 110 cooks the food material 140 inside the extruder chamber 116. The food material 140 inside the extruder chamber 116 is heated to at least partially gelatinize the starch component of the food material 140. In some examples, the total moisture of the food material 140 inside the extruder chamber 116 is between 15 percent and 20 percent. A range of 15 percent to 20 percent is typical for direct expanded, puffed cereal and snack products. The cooked food material 140 is extruded through the nozzle 118. The nozzle 118 serves to direct the food material 140 towards the die 300 containing one or a multitude of specially-designed orifices 200. The nozzle 118 consists of a first flow channel 126 that directs the food material 140 towards the die 300. The first flow channel 126 or multiple flow channels 126 may be surrounded by a hollow jacket 128, through which a cooling medium, such as liquid water can be circulated. In some examples, the food material 140 is at a temperature greater than 212° F., preferably between 250° F. and 350° F. The orifice 200 shapes and forms the food material 140 into one or more intermediary food materials 140 until the final desired shape is obtained. After passing through the orifice 200, the extruded food material 142 is cut by the cutting knife assembly 120. The cutting knife assembly 120 drives a cutting knife 122 over the end of the orifice 200. The cutting knife 122 serves to sever the continuous stream of extruded food material 142 output by the orifice 200 into smaller pieces or a cut food product 144. The shape and size of the orifice 200, in combination with the rate at which the cutting knife assembly 120 moves the cutting knife 122, determines the size and shape of the cut food product 144. The cut food product 144 passes to the toaster oven 130. The toaster oven 130 may include a conveyer 132 or other means of transporting the cut food product 144 through the toaster oven 130. Any method to suitably cook the cut food product 144 and lower the moisture content to a moisture content suitable for a shelf stable moisture content is acceptable.

Figure 2:
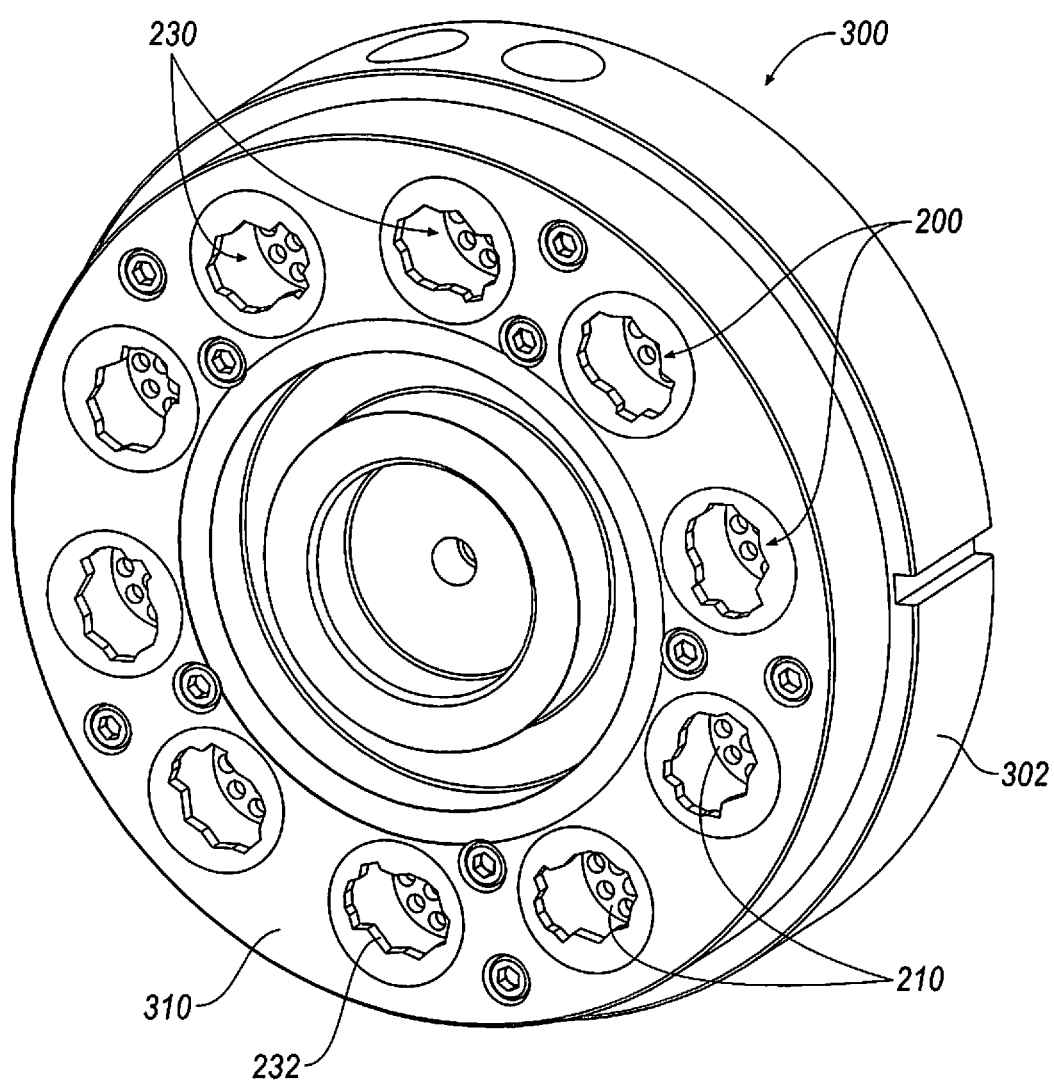
FIG. 2 is a top perspective view of the die.

FIG. 2 shows a perspective view of the die 300. The nozzle 118 directs the food material 140, that is pressurized and heated by the cooking extruder 110, towards the die 300. The die contains multiple orifices 200 that are encapsulated by the die front plate 302 and die rear plate 310. The shape of the die front plate 302 in combination with the nozzle 118 directs the extruded food material 142 contained in the flow channel 118 towards one or more of the orifices 200. At the entrance to the die 300, the food material 140 may be a pressurized liquid with suitable moisture content.

Figure 3:
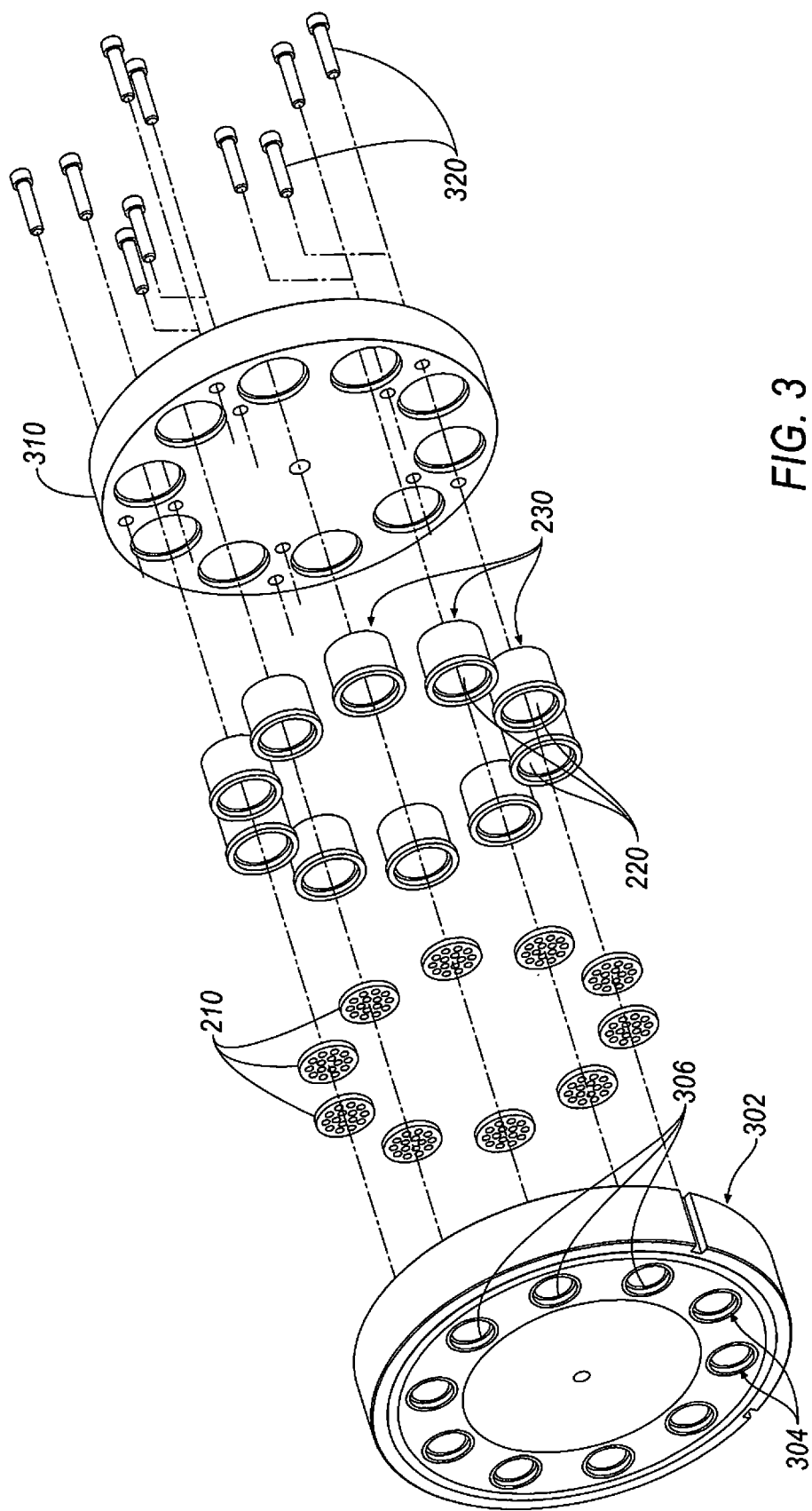
FIG. 3 is a exploded view of the die.

FIG. 3 shows an expanded view of the die 300 containing multiple orifices 200. The pressurized and heated extruded food material 142 enters the die input port 304 contained on the die front plate 302. The die input port directs the food material 140 to one or more second flow channels 306. In some examples, each second flow channel 306 has a larger cross-sectional area than the first flow channel 126 allowing the pressurized and heated extruded food material 142 to expand slightly, creating a rubbery consistency. In some examples, each second flow channel 306 has about the same cross-sectional area as the first flow channel 126. Each of the second flow charnels 306 directs the extruded food material 142 towards the orifice 200 contained within the second flow channel 306. The extruded food material 142 is directed towards the breaker screen 210 attached to the orifice 200. The second flow channel 306 may be of a size or length suitable to allow an even distribution of extruded food material 142 across the face of the breaker screen 210. The breaker screen 210 adds resistance to the flow of the extruded food material 142. The extruded food material 142 passes through the breaker screen 210 and enters the expansion chamber 220. The extruded food material 142 expands and takes on a rubbery consistency. In some examples, the moisture contained within the extruded food material 142 causes expansion of the extruded food material 142 due to the change in pressure of the food material 142 within the expansion chamber 220. The pressure of the food material 142 within the expansion chamber 220 may be lower than the vapor pressure of the extruded food material 142. The extruded food material 142 that has expanded in the expansion chamber 220 is recompressed by the rim 232 to exit the exit orifice 230. The rim 232 and exit orifice 230 add drag and compress the extruded food material 142, preventing the moisture contained within the extruded food material 142 from bursting and forming an open cell structure, instead remaining as a closed cell structure. The extruded food material 142 may exit the exit orifice 230 contained within the die rear plate 310. The extruded food material 142 is cut by the cutting knife 122 into thin flakes creating cut food product 140. The cutting knife 122 is driven by the cutting knife assembly 120 and may drive the cutting knife 122 at a rate to ensure a closed cell cut food product is formed. The rate of the cutting knife 122 may be dependent on the speed of the extruded food material 142 exiting the exit orifice 230 based on the pressure and material input by the cooking extruder 110. The rate of the cutting knife 122 may be varied based on the bubbles of moisture contained within the extruded food material 142 to ensure a closed cell structure appearance.

Figure 4:
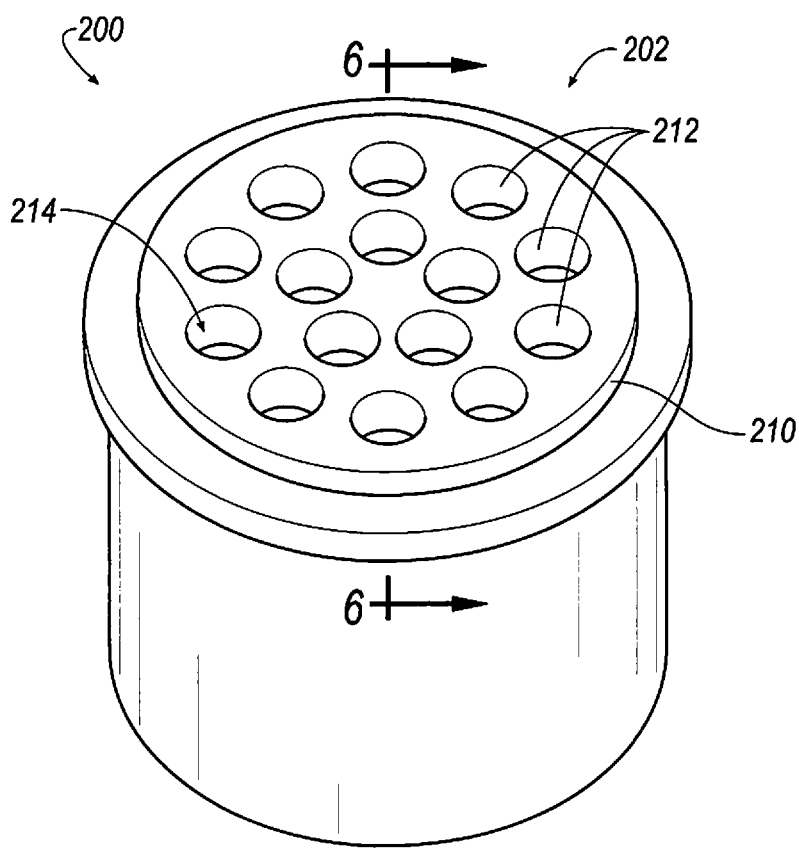
FIG. 4 is a top perspective view of the orifice.

FIG. 4 shows a top perspective view of the orifice 200. At the food material 140 inlet 202, the orifice 200 consists of a breaker screen 210. The breaker screen 210 may be equal to or different from the diameter of the second flow channel 306 of the die 200. The breaker screen 219 includes a multitude of holes 212. The multitude of holes 212 may be in a multitude of patterns. In some examples, the diameter of the breaker screen 210 is larger than the diameter of the flow pattern of the food material 140 flowing through the second flow channel 306. The breaker screen 210 may be mounted inside a secondary flow channel 306 of a diameter equal to that of the breaker screen 210, but larger than that of the first flow channel 126, at a distance from the end of the first flow channel 126 that allows the food material 140 to spread out over the entire surface of the breaker screen 210. The pattern of holes 212 of the breaker screen 210 can be a multitude of equally-sized round holes 212, a combination of different-sized holes 212, holes 212 of a shape different from a round hole 212, or a combination of holes 212 having any geometric shape. In some examples, the combined hole cross-sectional area 214 of all holes 212 in the breaker screen 210 is less than the expansion cross-sectional area 224 of the expansion chamber 220 following the breaker screen 210. At least one purpose of the holes 212 and breaker screen 210 is to provide a resistance to the flow of the cooked food material 140 that allows the cooked food material 140 to maintain a pressure above the vapor pressure that is associated with the temperature of the cooked food material 140 before the food material 140 enters the orifice 200. This assures that the moisture within the food material 140 remains in a liquid state and may help prevent the food material 140 from pre-mature puffing while in the second flow channel 306 before the breaker screen 210. The pressure of the cooked food material 140 is typically between about 100 PSI (Pounds Per Square Inch) and about 2500 PSI, while the cooked food material 140 is still inside the first flow channel 126 and second flow channel 306. The breaker screen 210 allows the pressurized cooked food material 140 to experience a sudden drop in pressure below the vapor pressure, allowing a portion of the water inside the cooked food material 140 to instantly evaporate and puff the cooked food material 140.

Figure 6:
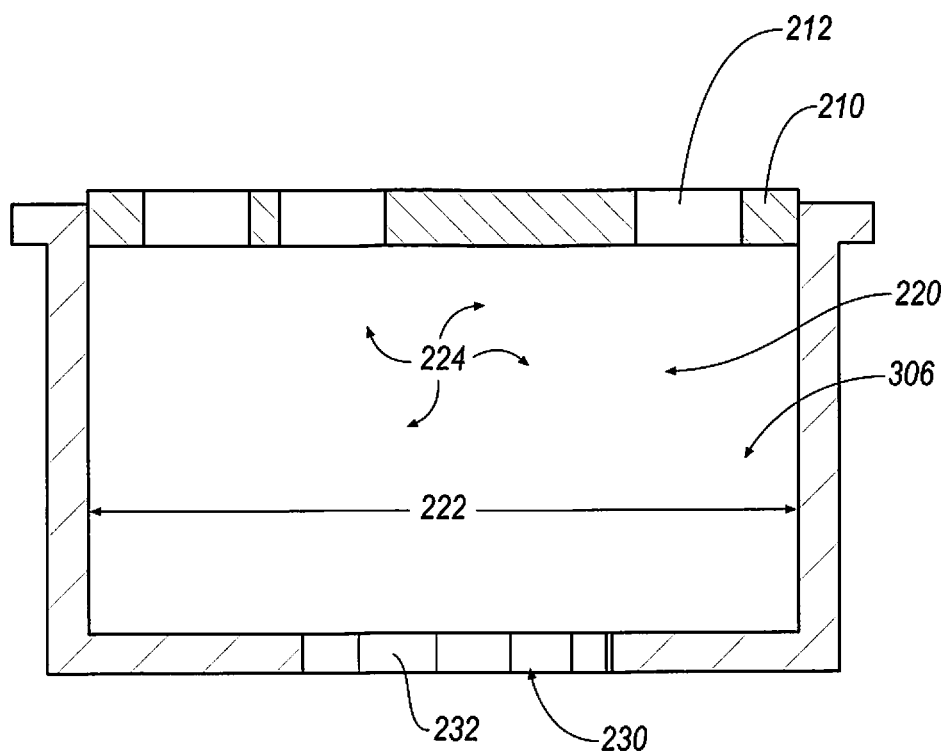
FIG. 6 is a cross-sectional view of the orifice.

FIG. 6 shows a cross-sectional view of the orifice 200. After the breaker screen 210 the orifice 200 consists of an expansion chamber 220. In some examples, the diameter 222 of the expansion chamber 220 is similar to that of the breaker screen 210. The length of the expansion chamber 220 is such that the individual streams of food material 140 exiting the holes 212 of the breaker screen 210 have at least enough time to touch each other and to stick together before they pass through the exit orifice 230 of the orifice 200. In some examples, the length of the expansion chamber is long enough to allow a portion of the moisture within food material 140 to instantly evaporate and puff the food material 140. The length of the expansion chamber 220 depends on the characteristics of the raw material, the cooking conditions within the cooking extruder 110 that the food material 140 was exposed to, and the geometry of the exit orifice 230, and can be optimized for each desired finished food product 146.

Figure 5:
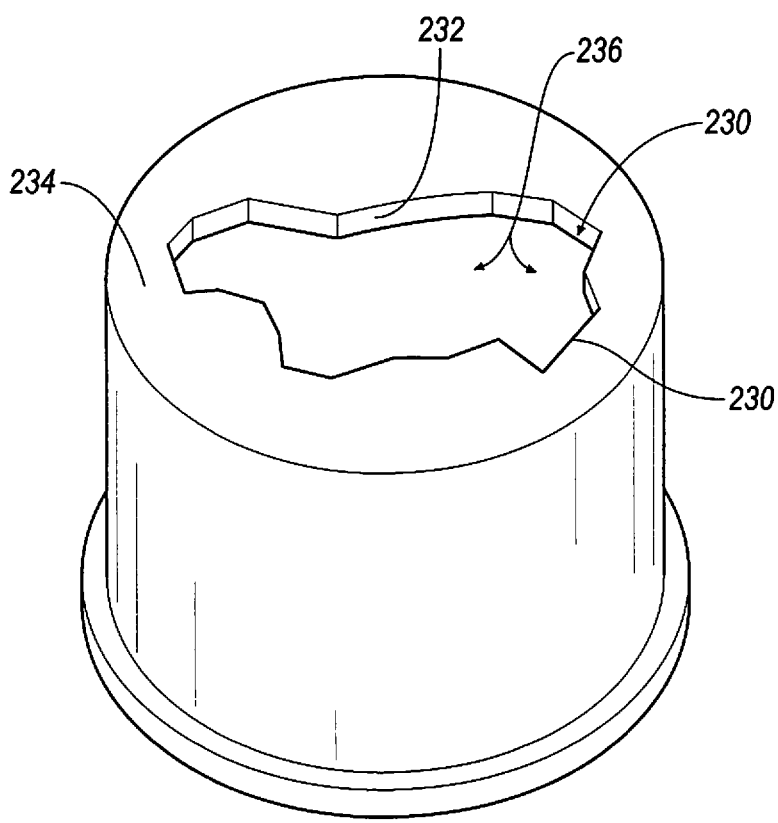
FIG. 5 is a bottom perspective view of the orifice.

FIG. 5 shows a bottom perspective view of the orifice 200. After the expansion chamber 220 of the orifice 200 consists of a rim 232 surrounding the exit orifice 230. The exit orifice 230 has a cross-sectional area smaller than that of the expansion chamber 220. The shape of the exit orifice 230 may be similar to the shape of the expansion chamber 220, or it may be different from that of the expansion chamber 220. The shape of the rim 232 determines the outlining shape of the finished food product 146 pieces. At least one desirable shape of the rim 232 forming the exit orifice 230 is one that looks like a deformed oval similar to the shape typically produced by the use of a flaking mill. In a setup with multiple orifices, the rim 232 of each exit orifice 230 may be different so that the bulk of the finished food product 146 appears like a random blend of flaked cereal pieces. The rim 232 re-compresses the extruded food material 142 after the extruded food material 142 has expanded in the expansion chamber 220, allowing the size of the steam-filled bubbles within the extruded food material 142 to be reduced. The exit orifice 230 and rim 232 also serve to form a cohesive mass of extruded food material 142 exiting the breaker screen 210 and contained within the expansion chamber 220. An exit orifice 230 that has an exit orifice area 236 that is too large may result in finished food products 146 with either an open cell structure similar to that of sliced bread, or may result in the release of an un-cohesive mass of finished food product 146 that easily disintegrate into smaller pieces that do not resemble the appearance of cereal flakes. Upon exiting the exit orifice 230, the extruded food material 142 may experience a secondary expansion as the compressed bubbles inside the extruded food material 142 decompress and form a rope of expanded, foamy food.

Figure 7:
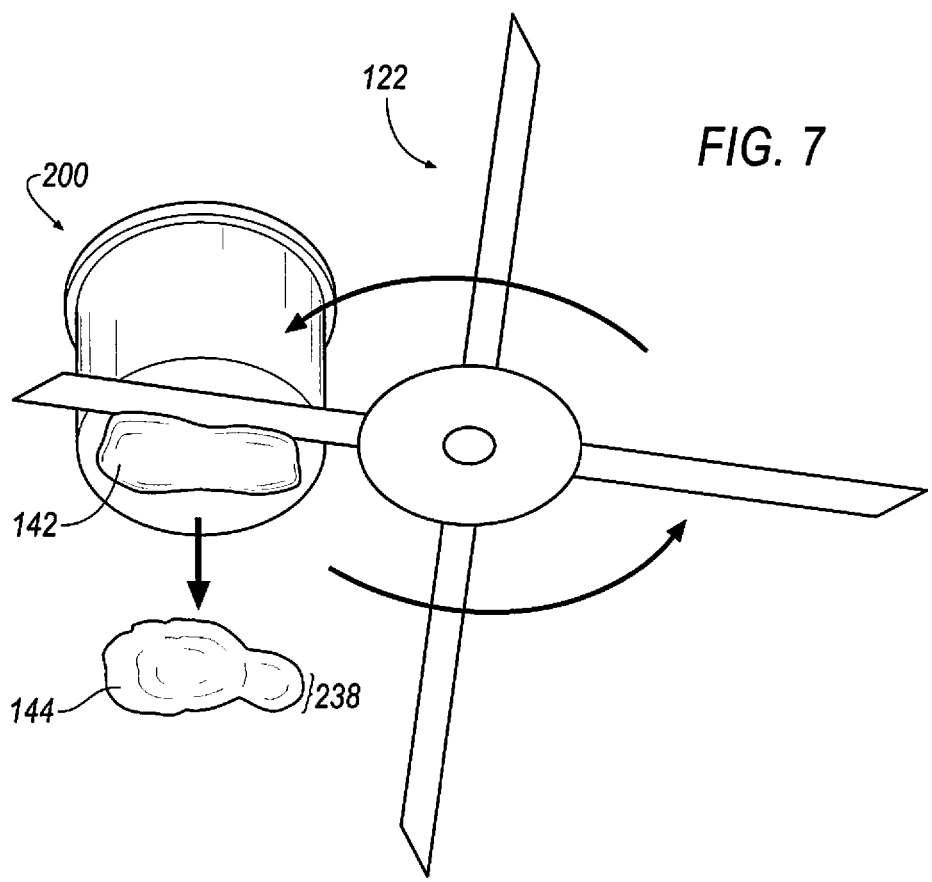
FIG. 7 shows a perspective view of the orifice, extruded food material, cut food product, and the cutting knife.
Figure 8:
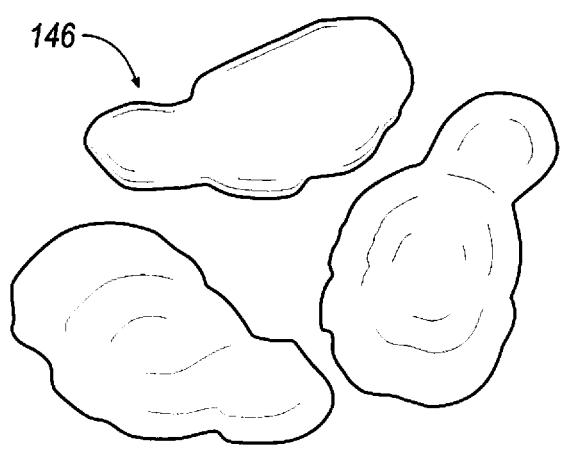
FIG. 8 is a view of the finished food product.

FIG. 7 shows a perspective view of the orifice 200, extruded food material 142, cut product 144, and the cutting knife 122. The extruded food material 142 exits the exit orifice 230 after being decompressed, and the cutting knife 122 slices the extruded food material 142 into thin discs of a thickness similar to or slightly thicker than that of cereal flakes as they are released from a flaking mill, creating the cut food product 144. The cutting knife 122 can be any cutter as typically used for production of extruded puffed or un-puffed cereal or snack items. The cutting knife 122 should cut at a speed such that the thickness of the cut food product 144 results in a slice thickness 238 that is smaller than the diameter of the bubbles within the extruded food material 142 after it has passed through the orifice 200. When the cutting knife 122 is operated at a speed that slices the food material 140 released from exit orifice 230 into a slice thickness 238 similar to or slightly thicker than that of conventionally produced cereal flakes, the cut food product 144 does not resemble a spongy or open cell structure that is typical for most other extrusion cooked grain based food materials, such as extruded puffed cereal. Unlike extruded puffed cereal or other extrusion cooked grains, which are typically cut at speeds that produce individual food pieces that have a thickness that is at least twice the slice thickness 238, the cut food product 142 and final food product 146 maintain a closed cell structure. When the food material 140 has a slice thickness 238 equal to or slightly thicker than conventionally-produced cereal flakes, the structure of the cut food product 144 does not resemble that of a sponge. Instead, the structure of the cut food product 144 is similar to that of conventionally produced cereal flakes and may be closed-celled. Surprisingly, the slicing of the food material 142 that results in a slice of the thickness 238 of about that of conventionally-flaked cereal also results in a slice thickness 238 that is smaller than the diameter of the bubbles within the extruded food material 142 after it has passed through the exit orifice 230. The slicing of the cut food material 144 to a slice thickness 238 smaller than the bubble size within the food material 140 may prevent the cut food material 144 from resembling a sponge-like structure typical for most conventionally produced puffed cereal or snacks. After cutting by the cutting knife 122, the cut food product 142 has a moisture content of less than about 20 percent, preferably a moisture content of about 14 to about 17 percent. The lower moisture content of the cut food product 144 allows the cut food product to be directly fed into the toaster oven 130 typically used for production of conventional cereal flakes without the risk of experiencing access blistering inside the toaster oven 130 that may occur when the cut food product has a moisture content of more than about 20 percent. The toaster oven reduces the moisture of the cut food product 144 to a desired shelf stable moisture content of typically less than about 3 percent without the need for an additional drying step, resulting in the finished final food product 146 as seen in FIG. 8. The finished food product 146 bulk density may be reduced below the bulk density of the cut food product 144 by feeding the cut food product 144 into the toaster oven 130 at an internal temperature between about 350 to about 500 Fahrenheit.

Figure 9:
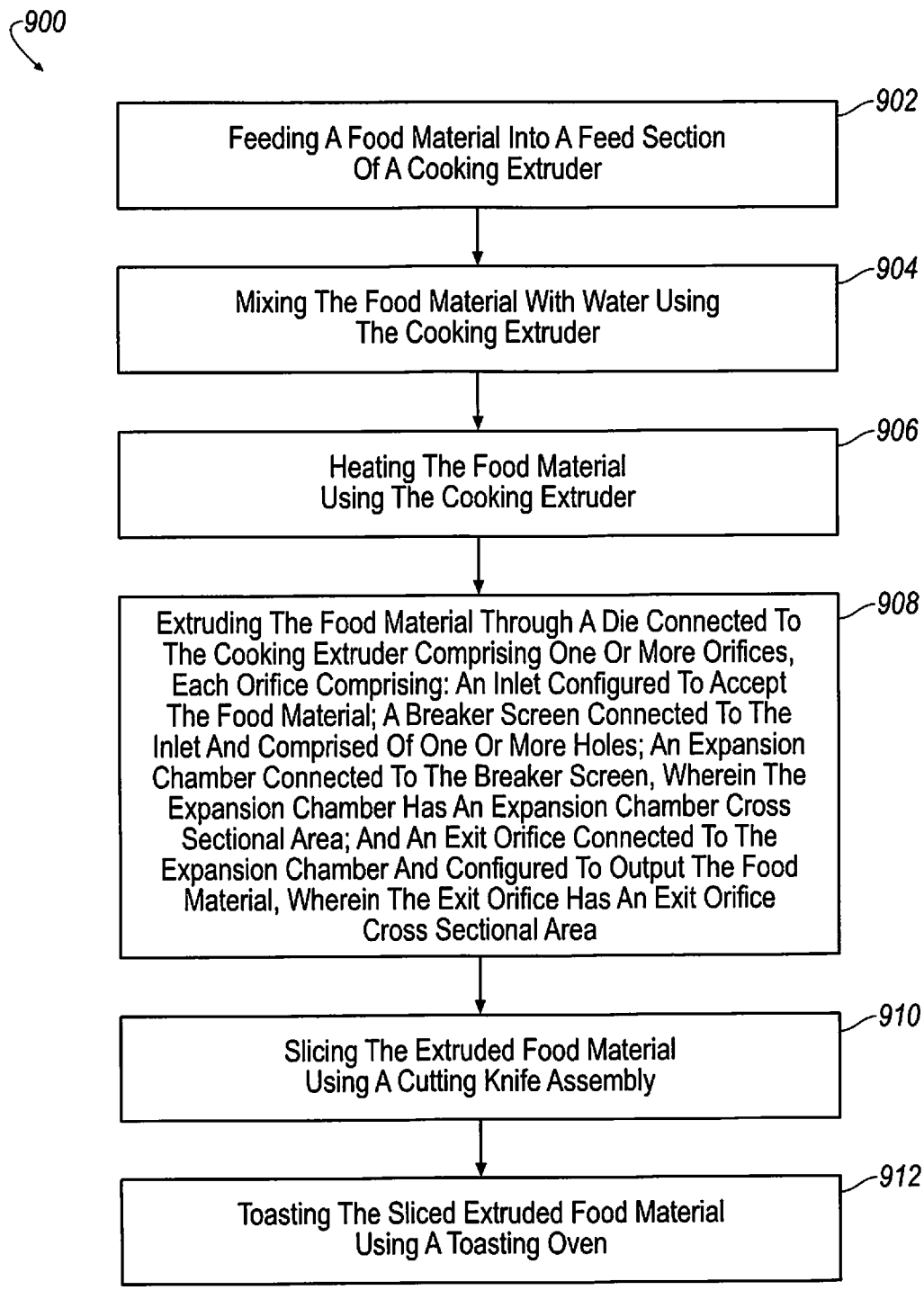
FIG. 9 is a method for producing flake-like cereal without the use of a flaking mill.

FIG. 9 shows a method 900 for producing flake-like cereal without the use of a flaking mill. At block 902, the method 900 includes feeding a food material 140 into a feed section 114 of a cooking extruder 110. The food material 140 is an individual or a blend of starch-containing food materials, such as grain flour optionally mixed with one or more other flavor, appearance, and texture-influencing ingredients, such as sugar and salt. The food material 140 may be extruded through the feed section 114 by a common single, twin, or multiple screw cooking extruder. At block 904, the method 900 includes mixing the food material 140 with water using the cooking extruder 110. At block 906, the method 900 includes heating the food material 140 using the cooking extruder 110. The cooking extruder 110 may mix the food material 140 with water to create the desired moisture content within the food material 140. The cooking extruder 110 may heat the mixture of food material 140 and water to the desired cooking temperature in order to at least partially gelatinize the starch component of the food material 140. The cooking extruder 110 has the ability to vary the time and temperature the food material 140 is heated to. At block 908, the method 900 includes extruding the food material 140 through an extruder orifice 200. The extruder orifice 200 includes an inlet 202 configured to accept the food material 140, a breaker screen 210 connected to the inlet 202 and comprised of one or more holes 212, and an expansion chamber 220 connected to the breaker screen 210. The expansion chamber 220 has an expansion chamber cross-sectional area 224 representative of the cross-sectional area of the expansion chamber 220. The orifice 200 further includes an exit orifice 230 connected to the expansion chamber 220, and the exit orifice 230 is configured to output the food material 140 or extruded food material 142. The exit orifice 230 has an exit orifice cross-sectional area 236. The food material 140 enters the orifice 200 and encounters resistance from the breaker screen 210. The breaker screen 210 allows the food material 140 to experience a sudden drop in pressure below the vapor pressure of the food material 140, allowing some of the water contained within the food material 140 to evaporate, reducing the total moisture content of the food material 140. The expansion chamber 220 continues to allow the food material 140 to expand while also allowing time for the food material 140 to touch each other and reconnect to form a semi-uniform food material 140. The exit orifice 230 consists of an exit orifice cross-sectional area 236 that is smaller than the expansion chamber cross-sectional area 224. The reduction in the cross-sectional area between the expansion chamber 220 and exit orifice 230 recompresses the expanded food material 140 in the expansion chamber 220, assisting in forming a cohesive food material 140 or extruded food material 142. The reduction also reduces the size of the vapor-filled bubbles contained within the food material 140. The shape of the rim 232 of the exit orifice 230 determines the shape of the extruded food material 142 and finished food product 146. At block 910, the method 900 includes slicing the extruded food material 142 using a cutting knife assembly 120. The cutting knife assembly 120 moves a cutting knife 122 to cut the extruded food product into a cut food product 144. The cutting knife assembly 120 may cut the extruded food material 140 such that the slice thickness 238 is smaller than the diameters of the bubbles of vapor contained within the extruded food material 142. At block 912, the method includes toasting the sliced extruded food material 142 using a toasting oven 130. The toaster oven 130 reduces the remaining moisture in the cut food product 144 to create the finished food product 146. In some examples, the cut food product 144 moisture is reduced to a shelf-stable moisture content of typically less than about three percent. In at least one example, the toaster oven 130 may heat the cut food product 144 at a temperature between about 350 and about 500 degrees Fahrenheit. In some examples, the toaster oven 130 cooks the cut food product for about two to about ten minutes.

In at least one example, the exit orifice cross-sectional area 236 is less than the expansion chamber cross-sectional area 224. The breaker screen 210 includes holes 212 with a hole cross-sectional area 214, and the hole cross-sectional area 214 may be less than the expansion chamber cross-sectional area 224. The cutting knife assembly 120 may slice the extruded food material 142 at a rate such that a slice thickness 238 is approximately less than the size of one or more vapor bubbles within the food material 140 or extruded food material 142. Heating the food material 140 using the cooking extruder 110 may further include heating the food material 140 using the cooking extruder 110 to a temperature greater than about 212 degrees Fahrenheit. The food material 140 or extruded food material 142 may be heated by the cooking extruder 110 such that the food material exits the exit orifice at a temperature approximately between about 250 degrees Fahrenheit and about 350 degrees Fahrenheit. The cooking extruder 110 may mix the food material with liquid food materials. The liquid food material may include one or more of the following: a solution of sugar, malt extract, salt or other flavors. The food material 140 may include a moisture content representative of the percentage of moisture contained within the food material. The moisture content may be determined by volume, mass, weight or any other suitable method. In at least one example, the moisture content is determined by mass. The moisture content of the food material 140 may be determined when the food material is within the feed section 114, extruder chamber 116, nozzle 118, and/or first flow channel 126 before the orifice 200. The moisture content of the food material 140 may also be determined at the inlet 202 of the orifice 200. The moisture content may be approximately less than 20 percent and may be approximately between 14 and 17 percent.

A number of implementations have been described. Nevertheless, it will be understood that various modifications may be made without departing from the spirit and scope of the disclosure. Accordingly, other implementations are within the scope of the following claims.

What is claimed is:

1. A system including a cooking extruder, a food material, and an extruded food material having a slice thickness, the system comprising:
    a food material;
    a cooking extruder configured to extrude the food material into an extruded food material having a slice thickness;
    a die connected to the cooking extruder comprised of at least one orifice; the at least one orifice comprising:
    an inlet including a first flow channel configured to accept the food material, the first flow channel surrounded by a hollow jacket for circulating cooling medium;
    a breaker screen connected to the inlet and comprised of one or more holes;
    wherein the first flow channel and the hollow jacket for circulating the cooling medium are positioned upstream of the breaker screen;
    an expansion chamber connected to the breaker screen, wherein the expansion chamber has an expansion chamber cross-sectional area;
    an exit orifice connected to the expansion chamber and configured to output the food material, wherein the exit orifice has an exit orifice cross-sectional area and wherein the food material outputs the exit orifice at a temperature between 250 degrees Fahrenheit and 350 degrees Fahrenheit;
    a cutting knife assembly at the exit orifice configured to cut the food material at a rate to create a slice thickness, wherein the cutting knife assembly cuts the food material at a rate such that the slice thickness is less than a size of one or more vapor bubbles within the food material; and
    a sliced food material extruded and cut from the cooking extruder wherein the sliced food material has a thickness smaller than a diameter of vapor bubbles within the food material.

2. The extruder system of claim 1, wherein the exit orifice cross-sectional area is less than the expansion chamber cross-sectional area.

3. The extruder system of claim 1, wherein the one or more holes include a hole cross-sectional area and the combined hole cross-sectional area of all holes in the breaker screen is less than the expansion chamber cross-sectional area.

4. The extruder system of claim 1, wherein the cooking extruder heats the food material to a temperature greater than 212 degrees Fahrenheit.

5. The extruder system of claim 1, wherein the cooking extruder mixes water with the food material and the food material includes a moisture content.

6. The extruder system of claim 5, wherein the moisture content is less than 20 percent.

7. The extruder system of claim 5, wherein the moisture content is between 14 and 17 percent.

8. The extruder system of claim 1, wherein a toaster oven is connected to the cooking extruder and configured to accept the food material cut by the cutting knife assembly.

* * * * *